United States Patent
Ikeda

(10) Patent No.: US 9,307,123 B2
(45) Date of Patent: Apr. 5, 2016

(54) NOISE REDUCTION APPARATUS AND NOISE REDUCTION METHOD

(71) Applicant: CANON KABUSHIKI KAISHA, Tokyo (JP)

(72) Inventor: Satoshi Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 13/870,221

(22) Filed: Apr. 25, 2013

(65) Prior Publication Data

US 2013/0314603 A1  Nov. 28, 2013

(30) Foreign Application Priority Data

May 25, 2012 (JP) .................. 2012-120138

(51) Int. Cl.
| | |
|---|---|
| *H04N 5/217* | (2011.01) |
| *H04N 9/083* | (2006.01) |
| *H04N 5/00* | (2011.01) |
| *H04N 5/21* | (2006.01) |
| *H04N 5/232* | (2006.01) |
| *H04N 17/00* | (2006.01) |

(52) U.S. Cl.
CPC .............. *H04N 5/21* (2013.01); *H04N 5/23229* (2013.01); *H04N 17/002* (2013.01)

(58) Field of Classification Search
CPC .................. H04N 19/00066; H04N 19/00896; H04N 19/00278; H04N 19/00545; H04N 19/0089; H04N 19/00551; H04N 19/00072; H04N 19/00139; H04N 19/00157; H04N 19/00272; H04N 13/0048; H04N 19/00212
USPC ................................................ 348/241, 270
See application file for complete search history.

(56) References Cited

U.S. PATENT DOCUMENTS

| | | | |
|---|---|---|---|
| 6,907,143 B2 | 6/2005 | Ferguson | |
| 7,295,103 B2 * | 11/2007 | Muller et al. | ................. 340/443 |

(Continued)

FOREIGN PATENT DOCUMENTS

| | | |
|---|---|---|
| JP | 2003-069858 A | 3/2003 |
| JP | 2003-333370 A | 11/2003 |
| JP | 2010-147774 A | 7/2010 |

OTHER PUBLICATIONS

Mark D. Fairchild et al,. "Image Appearance Modelling", SPIE/IS&T Electronic Imaging Conference, SPIE vol. 50007, 2003, pp. 149-160.*

(Continued)

*Primary Examiner* — Trung Diep
(74) *Attorney, Agent, or Firm* — Fitzpatrick, Cella, Harper & Scinto

(57) ABSTRACT

A noise reduction apparatus includes an input unit to input a captured image signal from a capturing unit. An acquisition unit acquires, according to a user operation, a temporal noise signal of the capturing unit based on the captured image signal. An estimation unit estimates an ideal image signal that has no noise, based on the captured image signal and the temporal noise signal. A removing unit removes a temporal frequency component higher than a predetermined threshold from each of the estimated ideal image signal and the acquired temporal noise signal. A generating unit generates a filter used for temporal noise reduction for a captured image signal in accordance with an added signal obtained by adding the ideal image signal from which the temporal frequency component has been removed by the removing unit and the noise signal from which the temporal frequency component has been removed by the removing unit.

16 Claims, 7 Drawing Sheets

(56) References Cited

U.S. PATENT DOCUMENTS 7,295,616 B2 * 11/2007 Sun et al. ............... 375/240.27
8,620,103 B2 * 12/2013 Chiu et al. .................. 382/275
2009/0278961 A1 * 11/2009 Mohanty et al. ............ 348/241

OTHER PUBLICATIONS

Mark D. Fairchil et al., Image Appearance Modelling:, SPIE/IS&T Electronic Imaging Conference, SPIE vol. 50007, 2003, pp. 149-160.*

* cited by examiner

| ISO SENSITIVITY | NOISE CHARACTERISTIC ADDRESS |
|---|---|
| ISO200 | 0xaaaaaaaaa |
| ISO400 | 0xbbbbbbbb |
| ISO800 | 0xcccccccc |
| ISO1600 | 0xdddddddd |
| ISO3200 | 0xeeeeeeee |

NOISE REDUCTION APPARATUS AND NOISE REDUCTION METHOD

CLAIM OF PRIORITY

This application claims the benefit of Japanese Patent Application No. 2012-120138, filed May 25, 2012, which is hereby incorporated by reference herein in its entirety.

BACKGROUND OF THE INVENTION

1. Field of the Invention

The present invention relates to noise reduction technology that reduces noise by performing temporal filtering on a video image signal of a moving image captured by a digital video camera, or the like, and to a noise reduction apparatus and a noise reduction method to which the noise reduction technology is applied.

2. Description of the Related Art

Conventionally, various noise reduction methods have been developed in order to improve the image quality of image capture devices. Video noise reduction technology is broadly divided into spatial filter-type noise reduction that performs spatial filtering and temporal filter-type noise reduction that performs temporal filtering.

Temporal filter-type noise reduction has an advantage that noise can be reduced while maintaining resolution, because spatial frequency components of a video image ideally do not deteriorate. With regard to temporal filter-type noise reduction, many techniques for switching processing in accordance with an object or upstream image processing have been proposed.

In Japanese Patent Laid-Open No. 2003-333370, temporal filter-type noise reduction that suppresses deterioration due to motion blur that occurs in a case when an object is moving has been proposed. In order to avoid deterioration due to blur deterioration, noise reduction is switched in accordance with the motion vector of an object.

In Japanese Patent Laid-Open No. 2010-147774, a coefficient of temporal noise reduction is changed so that noise variance is constant, in accordance with upstream frame rate conversion processing of noise reduction processing.

With the conventional techniques described in Japanese Patent Laid-Open No. 2003-333370 and Japanese Patent Laid-Open No. 2010-147774, there is a problem in that, although adaptive noise reduction is performed on an object or image processing, variance of the noise itself is not taken into consideration. With regard to moving image noise, temporal variance of the noise itself is a significant factor determining the perceived amount of noise. For example, if a 24 fps moving image with noise is compared with each frame viewed as a still image, the variance of noise will be more noticeable in the moving image, and thus, the noise is strongly perceived. In this manner, even in a case when signals have the same amount of noise, if temporal characteristics of noise, such as the changing temporal frequency of noise, for example, are different, the amount of noise that a person perceives will also differ greatly. This is because human vision has the band-pass type qualities of being highly sensitive to variance of 5 to 10 Hz, but having substantially zero sensitivity when variance is greater than or equal to 60 Hz.

The temporal characteristics of noise depend on image capture conditions, such as ISO sensitivity, the temperature of the image sensor, and the like, and thus, differ for each image capture. Accordingly, even if the motion of an object or upstream image processing is the same, if the temporal characteristics of the noise itself are different, it is necessary to switch the noise reduction processing.

SUMMARY OF THE INVENTION

The present invention has been made in view of the above-mentioned conventional examples, and provides a noise reduction apparatus and a noise reduction method that improve the signal to noise (S/N) ratio, and process a moving image so that noise is not easily perceived in the moving image, while suppressing a noise component of a frequency band that is easily perceived by the human eye, based on a captured video image, a temporal characteristic of noise, and a time response characteristic of vision.

According to one aspect of the present invention, a noise reduction apparatus comprises a noise characteristic acquisition unit configured to acquire a noise characteristic indicating a temporal characteristic of a noise signal that is added to a video image signal, in accordance with an image capture condition of the video image, a video image characteristic acquisition unit configured to estimate a video image characteristic indicating a temporal characteristic of a video image signal to which noise is not added, a visual characteristic reflection unit configured to multiply the noise characteristic and the video image characteristic by a visual characteristic that is a time response characteristic of vision, a filter designing unit configured to generate a filter that is used for temporal noise reduction in accordance with the noise characteristic and the video image characteristic that are multiplied by the visual characteristic, and a filtering unit configured to perform temporal noise reduction processing on an input video image signal with a filter designed by the filter designing unit.

Alternatively, according to another aspect of the present invention, a noise reduction apparatus comprises a visual characteristic reflection unit configured to output a noise signal and a video image signal respectively obtained by reflecting a temporal frequency characteristic of vision in a temporal frequency characteristic of a noise signal and a temporal frequency characteristic of a captured video image signal, or a temporal frequency characteristic of a noise signal and a temporal frequency characteristic of a video image signal, a generating unit configured to generate a Wiener filter based on the output from the visual characteristic reflection unit, and a filtering unit configured to perform filtering on the video image signal with the generated Wiener filter.

With the present invention, a filter is designed so as to improve the S/N ratio, while suppressing a noise component of a frequency band that is easily perceived by the human eye, based on a captured video image, a temporal characteristic of noise, and a time response characteristic of vision. According to the present invention, it is possible to perform noise reduction processing that is adaptive to a temporal characteristic of noise that is different for each image capture and by which noise is not easily perceived.

Further features of the present invention will become apparent from the following description of exemplary embodiments with reference to the attached drawings.

DESCRIPTION OF THE EMBODIMENTS

Embodiment 1

The present embodiment designs a filter for temporal noise reduction processing based on a temporal characteristic of noise and a temporal frequency response characteristic of vision. Specifically, a temporal characteristic of noise of an image capture device is acquired, and a Wiener filter is designed based on a noise characteristic that is multiplied by a time visual characteristic and an estimation value of a temporal characteristic of an ideal video image that does not have noise. Since the temporal characteristic of noise generally differs in accordance with image capture conditions, it is possible to apply an adaptive filter to noise reduction in accordance with noise and video image characteristics at the time of image capture. Moreover, with the present invention, since the time response characteristic of vision is taken into consideration when a filter is designed, the filter is designed such that a noise reduction effect is increased when a video image is viewed by the human eye.

Figure 1:
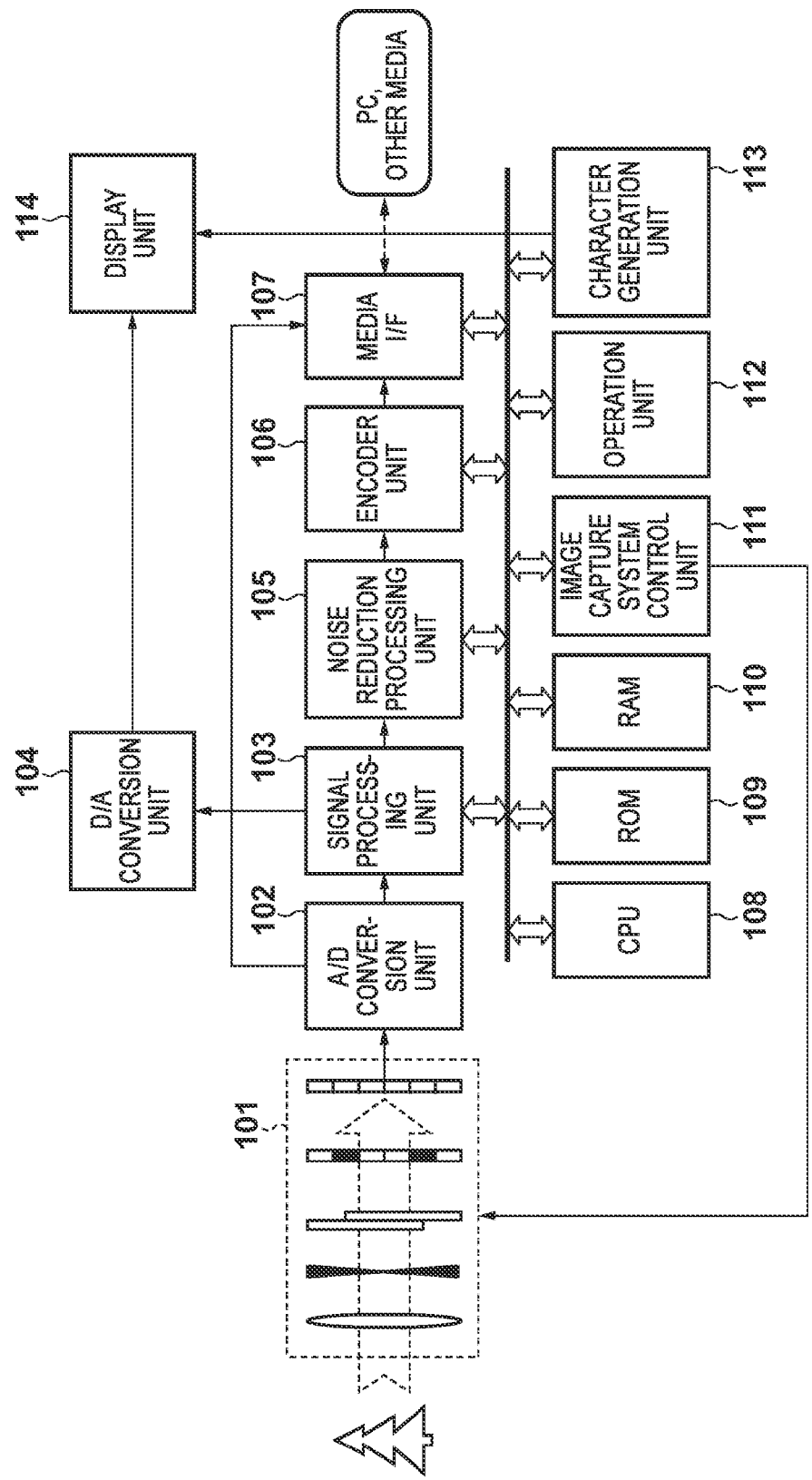
FIG. 1 is a block diagram showing an example of the configuration of an image capture device according to Embodiment 1.

FIG. 1 is a first embodiment of an image processing apparatus in the present invention. An image capture unit 101 includes a zoom lens, a focus lens, a blur correction lens, a diaphragm, a shutter, an optical low-pass filter, an iR cut filter, a color filter, and a sensor, such as a CMOS sensor or a CCD sensor, and detects an amount of light of an object. An A/D conversion unit 102 converts the amount of light of an object to a digital value. A signal processing unit 103 performs demosaicing processing, white balance processing, gamma processing, and the like, on the converted digital value. Thereafter, a noise reduction processing unit 105 removes noise in a video image signal, and generates a digital video image signal. A D/A conversion unit 104 performs analog conversion on the digital video image signal. An encoder 106 performs processing for converting the digital video image signal to a file format such as Mpeg. A media interface 107 is an interface for connecting to a personal computer (PC) or other media (e.g., a hard disk, a memory card, a CF card, an SD card, a USB memory, for example). A CPU 108 is involved in the overall processing of each constituent element, sequentially reads and interprets commands stored in a ROM 109 or a RAM 110, and executes processing in accordance with the results. The ROM 109 and the RAM 110 also provide the CPU 108 with programs, data, and working regions required for the processing. An image capture system control unit 111 performs control of an image capture system instructed by the CPU 108, such as focusing, shutter opening, diaphragm adjustment, and the like. An operation unit 112 corresponds to a button, a mode dial, or the like, and receives a user instruction that is input via such a button, a mode dial, and the like. A character generation unit 113 generates image data that corresponds to an input of a code, such as a character or a graphic. Generally, a liquid crystal display is widely used as a display unit 114, and the display unit 114 displays captured images and character images that are transmitted from the character generation unit 113 and the D/A conversion unit 104. The display unit 114 may also have a touch screen function, and, in this case, the display unit 114 is also capable of handling a user instruction as an input to the operation unit 111. Note that, although there are other constituent elements of the apparatus besides the above-mentioned elements, those elements are not the main focus of the present invention, and thus, a description thereof will be omitted. A video image signal to be processed in all embodiments is a digital video image signal that has been digitalized by the A/D conversion unit 102, and will be referred to as a "video image signal". This video image signal is a digital signal and can be stored in a memory, or the like, as digital data. Hereafter, in cases when storage of a video image signal or a noise signal is described, the digital data that forms the basis of these signals is stored.

Configuration of Noise Reduction Processing Unit 105

Figure 2:
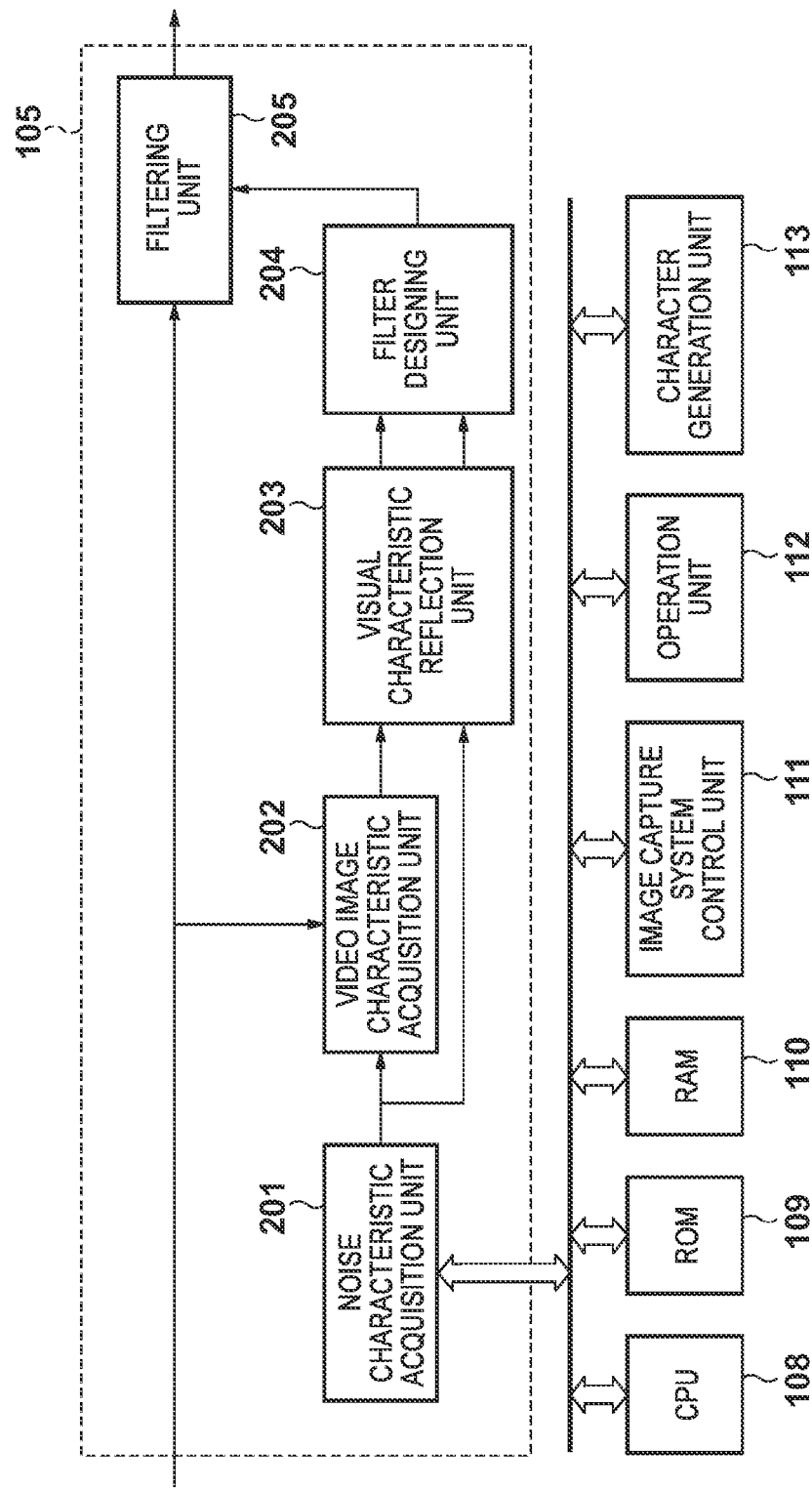
FIG. 2 is a block diagram showing an example of the configuration of a noise reduction processing unit of Embodiment 1.

FIG. 2 is an overall configuration of the noise reduction processing unit 105 of FIG. 1. An overall description is now given for each processing unit below. A noise characteristic acquisition unit 201 acquires a temporal frequency characteristic (also, simply referred to as a "characteristic" or a "temporal characteristic") N of a noise signal on a captured digital video image signal (referred to as a "captured video image signal") V. The noise characteristic N is a signal (noise characteristic signal) indicating a temporal frequency characteristic of noise. Here, the captured video image signal V is a video image signal to which noise reduction is applied, and is a video image signal that has been captured by an image capture device. The captured video image signal V is a video image signal containing noise. In the present embodiment, since the video image signal is acquired as a characteristic of the noise signal, a noise characteristic is a video image signal containing only noise. Note that the present invention is not limited thereto. A case when a filter is designed using a characteristic other than the video image signal will be described in Embodiment 4. A video image characteristic acquisition unit 202 estimates an ideal video image signal S that has no noise based on the captured video image signal V and the temporal characteristic N of the acquired noise signal. Here, it is desired to acquire a video image characteristic signal indicating a temporal frequency characteristic of a captured video image signal, and the ideal video image signal S is estimated as this signal. Next, a visual characteristic reflection unit 203 multiplies the acquired noise characteristic N and the video image signal S by a temporal frequency response characteristic of vision (also referred to as a time visual characteristic or a temporal frequency visual characteristic) to obtain a vision-compatible video image signal Svtf and a vision-compatible noise characteristic Nvtf. A filter designing unit 204 designs a noise reduction filter a, using the video image signal Svtf and the noise characteristic Nvtf that take consideration of visual characteristics as inputs. A filtering unit 205 applies the filter a designed in the filter designing unit 204 to the captured video image signal V to reduce noise of the captured video image signal.

Figure 3:
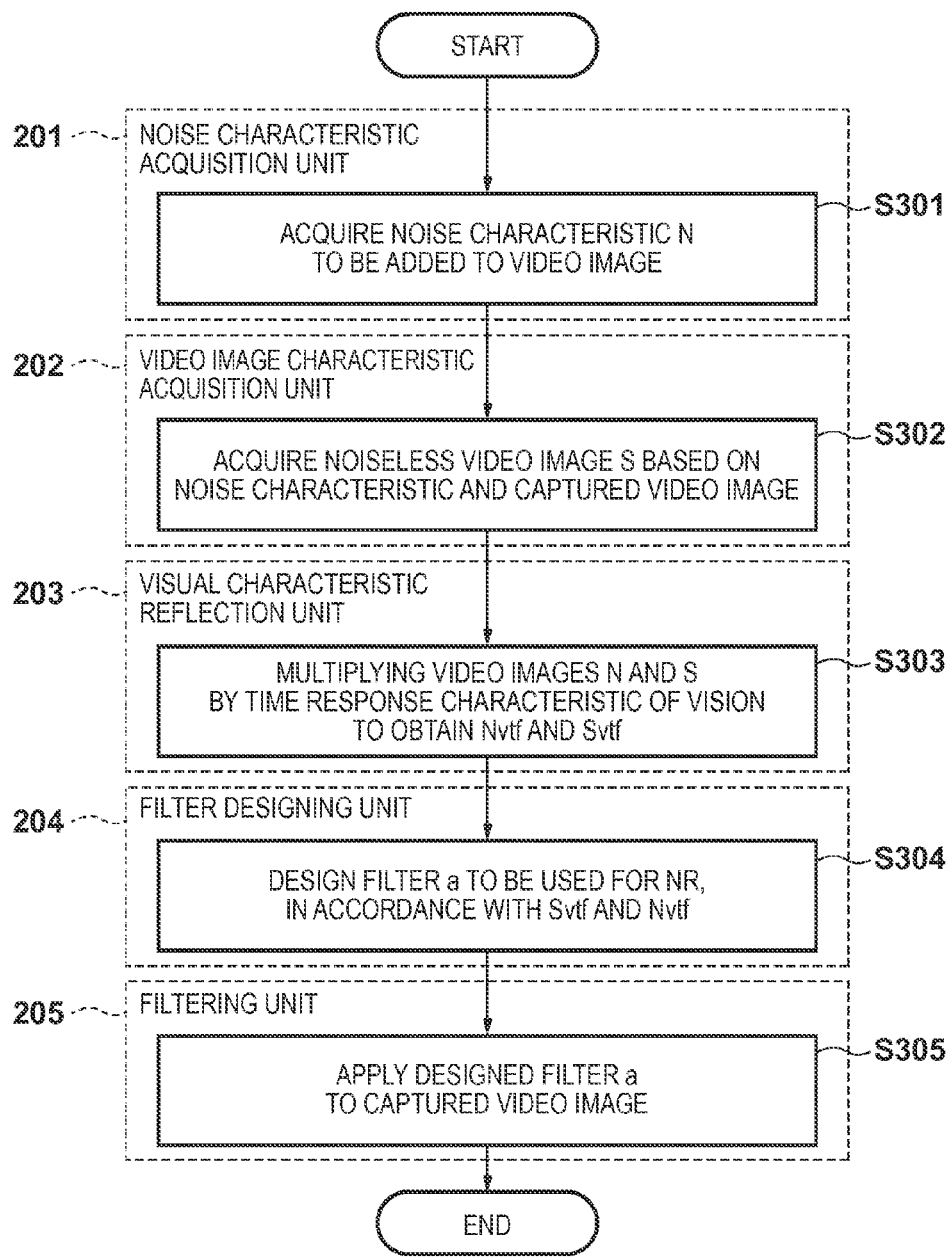
FIG. 3 is a flowchart showing operations of the noise reduction processing unit of Embodiment 1.

An overall operation of the noise reduction processing unit 105 according to the present embodiment is now described with reference to a flowchart of FIG. 3. This procedure is for determining the above-described filter a and performing filtering on a video image signal using the filter a.

In step S301, a noise characteristic that is used for designing a filter is acquired. In the present embodiment, the noise video image signal N is acquired as a characteristic of noise. In step S301, the video image signal N that only has noise is acquired by performing image capture without capturing an image of an object. The operation of this step is performed by the noise characteristic acquisition unit 201, and the operation thereof will be described later.

In step S302, the ideal video image signal S that does not have noise is acquired. In the present embodiment, the ideal video image signal S is estimated using the noise characteristic N and the captured video image signal V. The ideal video image signal S acquired in this step is used for designing an optimal noise reduction filter in the filter designing unit 204. The operation of step S302 is performed by the video image characteristic acquisition unit 202, and the operation thereof will be described in detail later.

In step S303, the acquired noise characteristic (that is, a video image signal N) and the ideal video image signal S are multiplied by a time response characteristic of vision, and the noise characteristic Nvtf and the video image signal Svtf are obtained. Accordingly, an optimal filter can be designed in the downstream filter designing unit 204, taking human visual sensitivity into consideration. The operation of this step is performed by the visual characteristic reflection unit 203, and the specific processing will be described later.

In step S304, the filter a is designed based on the video image signal Svtf and a noise characteristic Nvtf so as to obtain a favorable noise reduction result. In the present embodiment, a noise reduction filter is designed as a Wiener filter. Specifically, the filter a is designed, assuming that a video image signal w=Svtf+Nvtf obtained by adding the vision-compatible noise signal Nvtf to the vision-compatible video image signal Svtf will be multiplied by the filter a, such that the mean squared error of the multiplication result and the vision-compatible video image signal Svtf is minimized. The operation of this step is performed by the filter designing unit 204, and the specific processing will be described later.

In step S305, noise reduction processing is performed by applying the filter a designed in step S304 to the captured video image signal V. The operation of this step is performed by the filtering unit 205.

Operations of Noise Characteristic Acquisition Unit 201

The operations of the noise characteristic acquisition unit 201 will be described in detail below. It is known that a temporal characteristic of noise on an input video image signal of the noise reduction processing unit 105 changes in accordance with an image capture condition, temperature of an image capture sensor, upstream image processing circuitry, and the like. Thus, the noise characteristic acquisition unit 201 acquires a different temporal characteristic of noise in accordance with an image capture condition from an image capture sensor. Specifically, after setting image capture parameters of a camera to conditions used at the time of image capture, the noise characteristic acquisition unit 201 performs image capture without exposure for a fixed time period in a state in which a lens cover is closed. The acquisition of a noise characteristic is started by an operator closing a lens cover and then giving an instruction to acquire a noise characteristic via the operation unit 112, for example. Thereafter, a video image signal is input to the noise characteristic acquisition unit 201 as a noise characteristic for a predetermined time period. The video image signal consists of only a noise signal since the video image captured by the above-described operations does not contain an object, and thus, it is possible to only acquire the noise characteristic therefrom. Hereafter, a noise video image signal obtained by this noise acquisition operation is expressed as N(x,y,t). Here, it may be conceivable that x and y indicate the position of a pixel in a frame, and t indicates an elapse of time such as a frame number, for example. The temporal characteristic (temporal frequency characteristic) of noise can be a frequency characteristic of noise that appears in the position of each pixel in a frame or an average value thereof.

Configuration of Video Image Characteristic Acquisition Unit 202

The video image characteristic acquisition unit 202 estimates the ideal video image signal S that has no noise as a signal indicating a characteristic of a video image signal, based on the captured video image signal V and the temporal characteristic N of an acquired noise signal. Here, the captured video image signal V is a video image signal that is subjected to filtering in the filtering unit 205. In the present embodiment, although a video image signal S is estimated by a spectral subtraction method, the present invention is not limited thereto.

Processing for estimating the video image S will be specifically described below. With the spectral subtraction method, estimation of the ideal video image signal S is performed by subtracting a difference in spectra of the noise characteristic N from a captured video image signal V. Specifically, the result of temporal Fourier transform Sfft(x,y,f) on the ideal video image signal S is expressed by the following equation.

$$Sfft(x,y,f) = (|Vfft(x,y,f)| - \alpha|Nfft(x,y,f)|)e^{argSfft}$$

Here, Nfft(x,y,f) indicates a result of temporal Fourier transform on the noise characteristic N, Vfft(x,y,f) indicates a result of temporal Fourier transform on the captured video image signal V, and argSfft indicates a phase of Sfft. Moreover, $\alpha$ is a coefficient that is more than or equal to 0 and less than or equal to 1, and is a parameter for setting an amount of reducing noise.

An estimation value for the ideal video image S can be obtained by performing inverse Fourier transform on the obtained Sfft.

Operations of Visual Characteristic Reflection Unit 203

Figure 4:
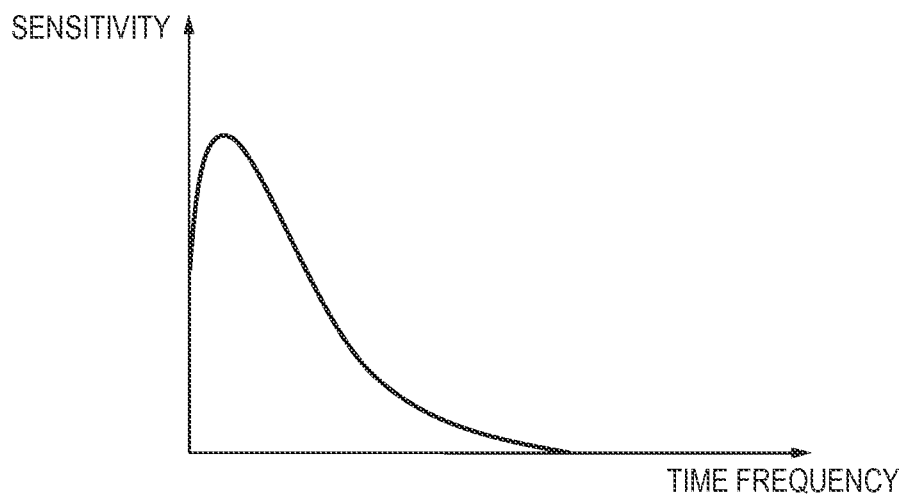
FIG. 4 is a schematic diagram of a visual characteristic.

The visual characteristic reflection unit 203 multiplies the noise characteristic N(x,y,t) acquired in the noise characteristic acquisition unit 201 and the video image signal S (x,y,t) acquired in video image characteristic acquisition unit 202 by a temporal frequency response characteristic of vision. Here, the temporal frequency response characteristic of vision responses is as in FIG. 4, and is expressed by the following equation, for example.

$$VTF(f) = 4.02*(1 - 0.85*\exp(-0.1*f)*\exp(-0.138*f)$$

Here, f denotes a temporal frequency and the unit thereof is Hz. In this manner, the temporal frequency response characteristic of vision has a form of a band-pass that hardly has sensitivity to stimulus of more than or equal to 60 Hz.

In the present embodiment, convolution of a filter vtf having the impulse response and the noise characteristic N and that of the filter vtf and the video image S are performed.

Specifically, the noise characteristic Nvtf and the video image signal Svtf are obtained by the following equations.

$$Nvtf(x, y, t) = \sum_{i=0}^{N-1} vtf(i) \cdot N(x, y, t-i)$$

$$Svtf(x, y, t) = \sum_{i=0}^{N-1} vtf(i) \cdot S(x, y, t-i)$$

Here, vtf(i) denotes a coefficient of the filter vtf. Also, the filter vtf may be obtained by performing inverse Fourier transform on the temporal frequency response characteristics VTF (f) (see FIG. 4), for example. Here, the above equations give a noise characteristic and a video image signal of a discrete digital moving image, and it may be conceivable that x and y respectively denote the position of a pixel in one frame, for example, and t denotes the time, a frame number in a video image having a given frame rate, for example.

Figure 5:
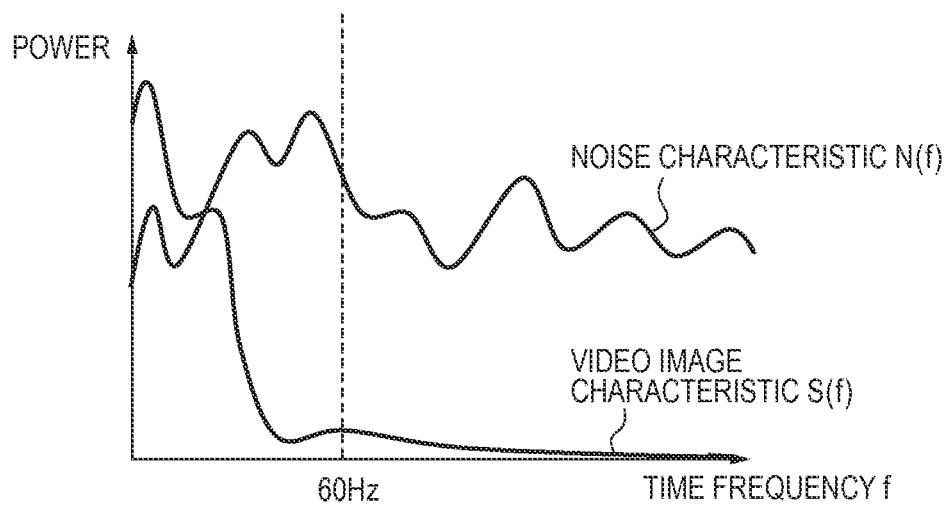
FIG. 5 is a schematic diagram showing an example of a relationship between a temporal characteristic of noise and a temporal characteristic of a video image.
Figure 6:
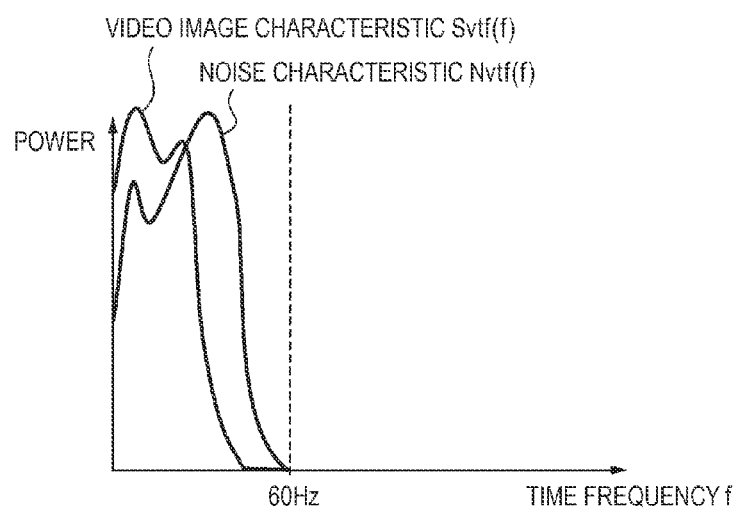
FIG. 6 is a schematic diagram showing an example of a relationship between a temporal characteristic of noise and a temporal characteristic of a video image after a visual characteristic is reflected therein.

In this manner, effects obtained by considering a response characteristic of vision are described below with reference to FIGS. 5 and 6. FIG. 5 is a conceptual diagram of frequency characteristics of the ideal video image signal S and the noise characteristic N when a visual characteristic is not considered. In a case when a filter is designed without considering the visual characteristic, the filter designing unit 204 designs an NR filter such that the mean squared error of a result of performing the noise reduction (NR) on signals (S+N) and the video image signal S is minimized. However, since sensitivity of human eyes is nearly 0 in a region on the right of a dotted line indicating 60 Hz shown in FIG. 5, for example, even if a noise component remains, a human does not fully perceive noise with their eyes. Nevertheless, with a technique in which the visual characteristic is not considered, a filter is designed to target an entire region of the temporal frequency. Thus, the filter obtained by the above-mentioned technique is not always optimal for human vision, and there is a case when effects of reducing noise are not so obtained. On the other hand, in the present invention, as shown in FIG. 6, a filter optimal for the noise characteristic Nvtf and the video image signal Svtf multiplied by the visual characteristic is designed. Weighting is applied to these power spectra based on the visual characteristic. In this manner, with noise reduction according to the present invention, the filter is designed so as to remove a noise component to which weighting is applied in accordance with perception sensitivity. Thus, it is possible to apply noise reduction processing so as to increase the effects of reducing noise in the case when a video image is viewed by the human eye.

Note that, in the present example, convolution is performed between a visual characteristic and a noise characteristic and a video image characteristic (see equation 3). However, if each characteristic is expressed by a power spectrum, it is possible to reflect a visual characteristic by multiplying a noise characteristic and a video image characteristic respectively by a visual characteristic.

Filter Designing Unit 204

The filter designing unit 204 designs a filter using the noise characteristic Nvtf and the video image signal Svtf obtained by the visual characteristic reflection unit 203. Specifically, for a video image signal w obtained by adding the noise characteristic Nvtf to the video image signal Svtf, a filter a is designed such that the mean squared error of the video image signal w and the video image signal Svtf is minimized. A specific method for calculating a filter is now described below.

First, an output signal X that is multiplied by the filter a derived/obtained for the video image signal w is considered. The output signal X is expressed by the following equation.

$$X(x, y, t) = \sum_{i=0}^{N-1} a(i) \cdot w(x, y, t-i)$$

Here, it is assumed that N indicates a filter length of the filter a, and is the same as the filter length of the filter vtf. Also, the video image signal w is expressed as w(x,y,t)=Svtf(x,y,t)+Nvtf(x,y,t).

Next, an expected value of the mean squared error of the output signal X(x,y,t) that was subjected to filter processing and the ideal video image signal Svtf(x,y,t) into which a visual characteristic was incorporated is expressed as below.

$$E\{e^2(t)\} = E\{X(x, y, t) - Svtf(x, y, t)^2\}$$

$$= E\{x^2(x, y, t)\} + E\{Svtf^2(x, y, t)\} - 2E\{x(x, y, t)Svtf(x, y, t)\}$$

$$= E\left\{\left(\sum_{i=0}^{N-1} a_i w(x, y, t-i)\right)^2\right\} + E\{Svtf^2(x, y, t)\} -$$

$$2E\left\{\sum_{i=0}^{N-1} a_i w(x, y, t-i)Svtf(x, y, t)\right\}$$

Here, E denotes the expected value.

The above-mentioned mean squared error takes a minimum value when derivatives related to a filter coefficient ai(i=1, 2, ... N) are 0 at the same time. Thus, when the mean squared error $E\{e^2(t)\}$ is differentiated with respect to a, the following is satisfied.

$$\frac{\partial E\{e^2(t)\}}{\partial a_i} = 2E\left\{\sum_{j=0}^{N-1} a_j w(x, y, t-j)w(x, y, t-i)\right\} -$$

$$2E\{w(x, y, t-i)Svtf(x, y, t)\}$$

$$= 2\sum_{j=0}^{N-1} E\{w(x, y, t-j)w(x, y, t-i)\}a_j -$$

$$2E\{w(x, y, t-i)Svtf(x, y, t)\}$$

$$= 0$$

Thus, if the filter a satisfies the following equation, the mean squared error is minimized.

$$\sum_{j=0}^{N} E\{w(x, y, t-j)w(x, y, t-i)\}a_j = E\left\{\sum_{i=0}^{N} w(x, y, t-i)Svtf(x, y, t)\right\}$$

Here, it is assumed that E{w(x,y,t-j)w(x,y,t-i)}=r(j-i), E{w(x,y,t-i)Svtf(x,y,t)}=p(i). For example, when an image size of one frame of the video image signal w is given as H vertical pixels by W horizontal pixels, r(j-i) and p(i) can specifically be calculated as follows. Note that the method for calculating r(j-i) and p(i) is not limited thereto.

$$r(j-i) = \frac{1}{WH}\sum_{x,y} w(x, y, t-j)w(x, y, t-i)$$

$$p(i) = \frac{1}{WH}\sum_{x,y} w(x, y, t-j)Svtf(x, y, t-i))$$

Also, assuming $$R = \begin{bmatrix} r(0) & r(-1) & \cdots & r(1-N) \\ r(1) & r(0) & \cdots & r(2-M) \\ \vdots & \vdots & \ddots & \vdots \\ r(N-1) & r(M-2) & \cdots & r(0) \end{bmatrix}$$

$$p = \begin{bmatrix} p(0) \\ p(1) \\ \vdots \\ p(N-1) \end{bmatrix}$$

$$a = \begin{bmatrix} a_0 \\ a_1 \\ \vdots \\ a_{N-1} \end{bmatrix},$$

filter a is expressed as follows.

$$Ra = p$$

$$a = R^{-1}p$$

Here, r denotes the average value of the products of corresponding pixel values in two frames included in the video image signal w obtained by adding the noise signal Nvtf to the ideal video image signal Svtf. A matrix R is a matrix of r that is determined by all combinations of i and j where N frames are targeted. Also, p denotes an average value of the products of corresponding pixel values in frames respectively included in the video image signal w and the ideal video image signal Svtf. A matrix p is a matrix of p that is determined by all combinations of the video image signal Svtf of a target frame and the video image signal w of a frame that is i frames prior to the target frame where N frames are targeted. As described above, since Svtf and Nvtf can be obtained from a captured video image signal, the filter a can also be obtained from these signals.

In the present embodiment, the filter designing unit 204 generates and stores the filter a expressed by the above expressions, as a filter that is optimal for a temporal characteristic of noise. This filter a is used in noise reduction processing in the downstream filtering unit 205. That is, the video image signal S whose noise is removed by applying the filter a to the captured video image signal V output from the signal processing unit 103 is output from the filtering unit 205. The application of the filter can be realized by calculating the equation 4 in which the signal w is substituted by the video image signal S, for example.

As above, according to the present embodiment, it is possible to realize processing for removing noise that is appropriate for characteristics of human vision by creating a noise filter with a consideration of a temporal frequency response characteristic of human vision and performing filtering with the created filter.

Embodiment 2

In Embodiment 1, a method of capturing an image in a state in which a lens cover is closed was used in order to acquire a noise characteristic, and thus, a step for acquiring a noise characteristic for each image capture was required. In contrast, in the present embodiment, a pre-acquired noise characteristic is used when a filter is designed. In the present embodiment, some types of noise characteristics are acquired in advance in accordance with ISO sensitivity that have great effects on a noise characteristic to design a Wiener filter using them. In the present embodiment, it is possible to omit a step for acquiring a noise characteristic for each image capture, and thus, there is an advantage in capturing an image smoothly. A difference from Embodiment 1 will be described below.

Configuration of Noise Characteristic Acquisition Unit 201

Figure 7:
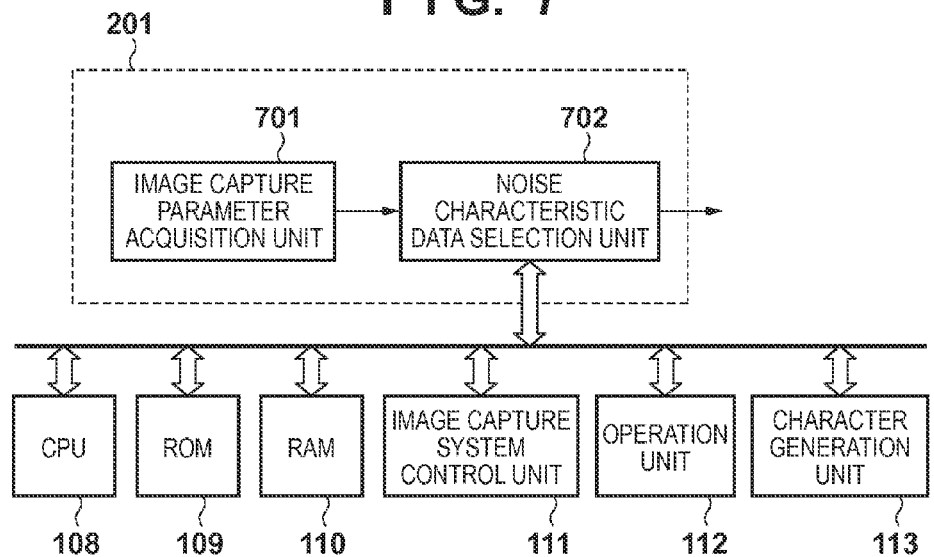
FIG. 7 is a block diagram showing an example of the configuration of a noise characteristic acquisition unit of Embodiment 2.

The operations of the noise characteristic acquisition unit 201 will be described in detail below. FIG. 7 is a schematic diagram showing the configuration of the noise characteristic acquisition unit 201. First, an image capture parameter acquisition unit 701 acquires ISO sensitivity at the time of image capture. Next, a noise characteristic data selection unit 702 acquires noise characteristic data N(x,y,t) that corresponds to the ISO sensitivity acquired in the image capture parameter acquisition unit 701. Specific processing of the noise characteristic selection unit 702 may be performed by referring to a noise characteristic table shown FIG. 8 and acquiring noise characteristic data associated with the acquired image capture parameter. For example, in the case of acquiring noise characteristic data of an ISO sensitivity 800, the noise characteristic acquisition unit 201 may refer to the table in FIG. 8, acquire address 0xcccccc in which the noise characteristic data associated with the ISO sensitivity 800 is stored, and accesses the address.

Note that the image capture parameter used in the image capture parameter acquisition unit 701 and the noise characteristic data selection unit 702 need not be of the ISO sensitivity. For example, the image capture parameters may be other image capture conditions, such as a sensor temperature and a shutter speed, or may be a combination thereof.

The filter designing unit acquires noise characteristic data N that corresponds to the ISO sensitivity, for example, and uses the acquired data for generating a filter. A method of generating the filter is similar to that of Embodiment 1. Also, the noise characteristics Nvtf in which a temporal frequency response characteristic of human vision was reflected may be determined in association with a plurality of parameter values, and the determined characteristics may be stored in the table in advance. With this, since the calculation in an upper part of equation 3 in Embodiment 1 is executed at the time of storing the noise characteristic data, it is not necessary to perform the calculation at the time of generating the filter, thus resulting in reducing a required time.

Embodiment 3

In Embodiment 1, the ideal video image signal S that does not have noise was estimated based on the input video image signal V and the noise characteristic N. Thus, an error of estimating the video image signal S in Embodiment 1 was not prevented from occurring, and there was a case when a sufficient noise reduction effect was not obtained depending on a video image. In view of this, in the present embodiment, the ideal video image signal S that does not have noise is set as a reference video image captured in advance to design a Wiener filter. Here, the reference video image refers to a video image that has little noise. For example, examples of the reference video image includes a video image captured at low sensitivity under bright ambient light, and the like. In the present embodiment, the reference video image is acquired in advance in accordance with a frame rate and a shutter speed that have great effects on characteristics of the video image. A difference from Embodiment 1 will be described below.

Configuration of Video Image Characteristic Acquisition Unit 202

Figures 8, 9:
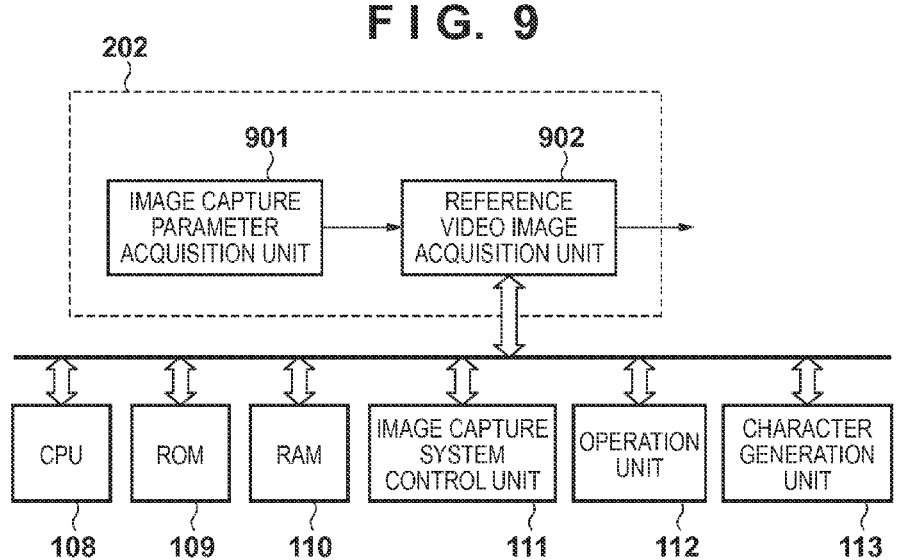
FIG. 8 is a schematic diagram showing an example of a reference table to which a noise characteristic data selection unit of Embodiment 2 refers.
FIG. 9 is a block diagram showing an example of a video image characteristic acquisition unit of Embodiment 3.

The video image characteristic acquisition unit 202 acquires a reference video image S that has no noise from a ROM 109. FIG. 9 is a schematic diagram showing the configuration of the video image characteristic acquisition unit 202. First, an image capture parameter acquisition unit 901 acquires a frame rate and a shutter speed at the time of image capture. Next, a reference video image acquisition unit 902 acquires a reference video image signal in accordance with the acquired frame rate and shutter speed from the ROM 109. At this time, data may be acquired using a reference table in which frame rate values and shutter speed values correspond to the addresses of the reference video image. The reference video image signal obtained in this manner is used as the ideal video image signal S in Embodiment 1, a noise filter is generated through procedures of Embodiment 1, along with the noise characteristic N obtained in noise characteristic acquisition unit 201 and the temporal frequency response characteristic VTF of human vision given in advance. Also, it may be possible to store, in the table, Nvtf calculated by applying VTF to a noise characteristic to be stored in association with parameter values. With this, since the calculation in a lower part of equation 3 in Embodiment 1 is executed at the time of storing the ideal video image signal, it is not necessary to perform the calculation at the time of generating a filter, thus resulting in reducing a required time. Also, in a case when a frame rate and a shutter speed are used as parameters, if these parameters of the image capture device are fixed, one corresponding ideal video image signal S needs only kept and the signal S is used to generate the filter.

Note that image capture parameters used in the image capture parameter acquisition unit 901 and the noise characteristic data selection unit 902 are not limited to a frame rate and a shutter speed. A motion vector of the video image signal V, and the like, may be used in order to use a suitable reference video image depending on a scene to be captured, for example. Accordingly, it is possible to use a reference video image whose motion is similar to the motion of the video image such as motion of an object for designing a filter, thus obtaining better noise reduction effects.

It is also possible to employ a configuration in which a noise characteristic is acquired based on a parameter (ISO sensitivity, for example), and an ideal video image signal is also acquired based on a parameter (frame rate and shutter speed, for example), through a combination of Embodiment 2 and the present embodiment. Moreover, it is possible to apply VTF to a stored video image signal and a noise characteristic, respectively. With this configuration, it is possible to acquire Nvtf and Svtf from image capture parameters, to obtain the video image signal w that has noise therefrom, and to obtain the filter a from the signal w and Svtf. Thus, due to a combination of Embodiments 2 and 3, it is possible to generate the noise filter a that is matched to a human visual characteristic and is suitable to image capture parameters without prior image capture for acquiring an ideal video image signal and a noise characteristic.

Embodiment 4

In the above embodiments, a filter used in noise reduction as a Wiener filter was designed using a noise characteristic and a video image characteristic. However, the above-mentioned method has issues in that massive arithmetic operations were required for processing to design the filter. In view of this, in the present embodiment, a suitable noise reduction filter is selected from among filters that has been designed and stored in advance. Specifically, the similarity, to which consideration of a visual characteristic is given, is calculated, with regard to the video image characteristic and the noise characteristic used to design the filter, and the video image characteristic and the noise characteristic at the time of image capture, to select a filter whose similarity is the highest. Here, a filter candidate for noise reduction may be acquired by a method similar to the above-mentioned embodiments, in advance, or may be a filter set by a person.

Moreover, the noise characteristic and the video image characteristic were acquired as the video image data (video image signal) in Embodiments 1 to 3. However, a data amount of video image data is huge, and thus, there were issues in the amount of calculation is increased in the downstream filter designing processing. In view of this, in the present embodiment, the noise characteristic and the video image characteristic are acquired, not as video image data, but as a frequency power spectra to design the filter. As described below, since the frequency power spectrum is kept as a first dimensional data in the present embodiment, the data amount and the calculation amount are both reduced. A difference from Embodiment 1 is now described below.

Operations of Noise Characteristic Acquisition Unit 201

The operations of the noise characteristic acquisition unit 201 will be described in detail below. First, the noise characteristic acquisition unit 201 acquires a different temporal characteristic of noise in accordance with an image capture condition from an image capture sensor. Specifically, after setting image capture parameters of a camera for conditions used at the time of image capture, the noise characteristic acquisition unit 201 performs image capture for a certain time period without exposure. Moreover, a noise characteristic is obtained by performing temporal Fourier transform on the acquired noise video image N(x,y,t) to averaging the noise video image in a spatial direction. Specifically, the noise characteristic Np(f) is obtained by the following equation.

$$Np(f) = \sum_{x,y} |Vfft(x, y, f)|^2 - \alpha Nv(f)$$

Here, Nfft is the Fourier transform of the noise video image N in a temporal axis direction.

Configuration of Video Image Characteristic Acquisition Unit 202

The video image characteristic acquisition unit 202 estimates an average value of temporal frequency power spectra of an ideal video image S that has no noise based on the captured video image signal V and the temporal characteristic N of the acquired noise signal. In the present embodiment, frequency power spectra of the ideal video image signal S are estimated by a spectral subtraction method. Specifically, the average frequency power spectrum Sp(f) of the video image signal S is acquired by the following equation.

$$Sp(f) = \sum_{x,y} |Vfft(x, y, f)|^2 - \alpha Nv(f)$$

Here, Vfft(x,y,f) is a result of the temporal Fourier transform on the captured video image V. Moreover, a is a coefficient that is more than or equal to 0 and less than or equal to 1, and is a parameter for setting an amount of reducing noise. Moreover, Np(f) is a power spectrum of the noise characteristic N.

Visual Characteristic Reflection Unit 203

The operations of the visual characteristic reflection unit 203 will be described below. In the present embodiment, multiplying the noise characteristic Npv and the video image characteristic Spv, respectively, by the visual characteristic in a frequency spatial region reflects the visual characteristic therein.

$$Npv(f) = VTF(f) \cdot Np(f)$$

$$Spv(f) = VTF(f) \cdot Sp(f)$$

Filter Designing Unit 204

Figure 10:
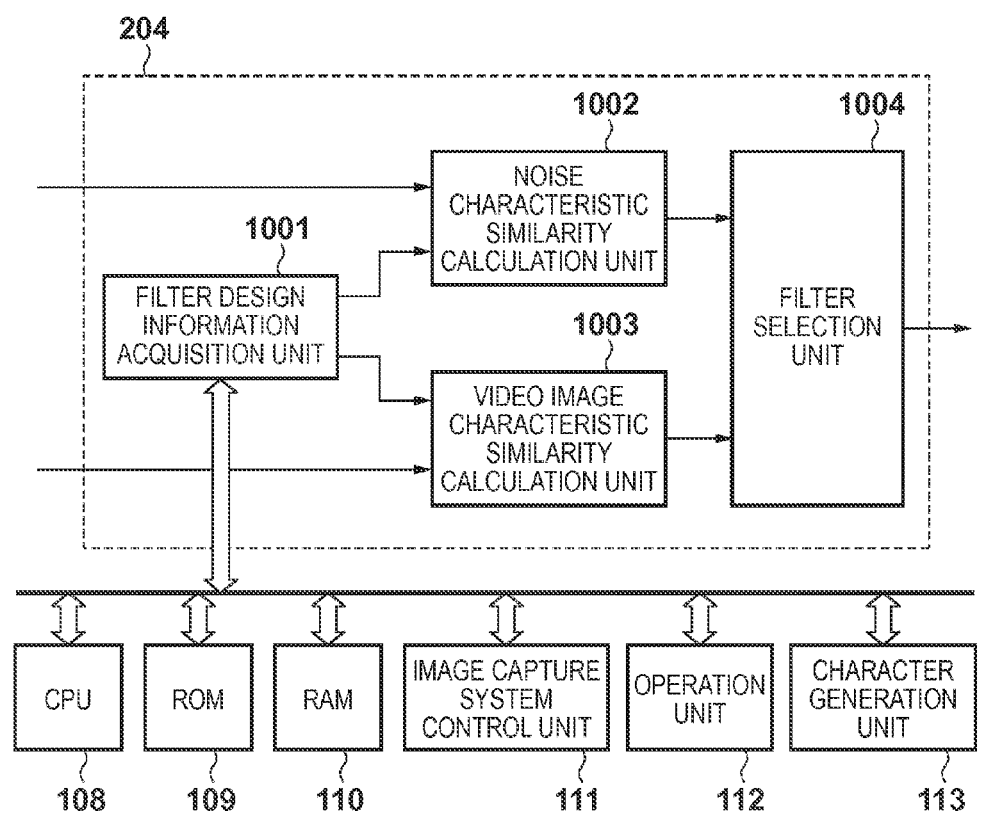
FIG. 10 is a block diagram showing an example of a filter designing unit of Embodiment 4.

The configuration of the filter designing unit 204 will be described below. FIG. 10 is a schematic diagram showing the configuration of the filter designing unit 204. Here, M denotes the total number of filter candidates, and the candidates are respectively expressed as F1, F2 ..., and FM. A filter design information acquisition unit 1001 acquires, from the ROM 109, Sf1, Sf2 ..., and SfM obtained by reflecting the visual characteristic in the video image characteristic used for designing each filter, and Nf1, Nf2 ..., and NfM obtained by reflecting the visual characteristic in the noise characteristic. Hereafter, data obtained by reflecting the visual characteristic in the video image characteristic corresponding to a filter Fm is expressed as Sfm, and data obtained by reflecting the visual characteristic in the noise characteristic is expressed as Nfm (m=1, 2 ..., M). Sfm and Nfm are data acquired for generating the filter Fm by a method similar to that used for obtaining Spv and Npv in equation 12. A noise characteristic similarity calculation unit 1002 respectively calculates the similarity between the acquired Nf1, Nf2 ..., and NfN, and Npv acquired in the noise characteristic acquisition unit 201. Moreover, a video image characteristic similarity calculation unit 1003 calculates the similarity between the acquired Sf1, Sf2 ..., and SfM, and Spv acquired by the video image characteristic acquisition unit 202. Furthermore, a filter selection unit 1004 selects an optimal filter based on the above-mentioned two similarities. The operations of the noise characteristic similarity calculation unit 1002, the video image characteristic similarity calculation unit 1003, and the filter selection unit 1004 will be described in detail below. Note that Sfm is an ideal video image signal obtained through image capture with a different parameter or image capture target. It is desirable to use a plurality of video image signals whose motion vectors are different from each other, such as a video image in which the motion of an object is slow and a video image in which the motion of an object is fast, in all together, for example. Moreover, Nfm can be obtained by capturing an image with a method of Embodiment 1 in a different environment (temperature, for example) so as to be selected in accordance with an image capture environment, for example. A filter is generated in advance using these signals by the procedure of Embodiment 1.

In the present example, although an index m is assumed to be a common value for Sfm and Nfm, it may be possible to generate the filter with a combination of different indices, such as Sfk and Nfm. In this case, the filter Fn generated is associated with the combination of indices k and m.

Noise Characteristic Similarity Calculation Unit 1002

The operations of the noise characteristic similarity calculation unit 1002 will be described below. The noise characteristic similarity calculation unit 1002 calculates an absolute value of the difference between the data Nfm (m=1, 2 ..., M) obtained by reflecting the visual characteristic in the noise characteristic at the time of designing the filter m and the data Npv obtained by reflecting the visual characteristic in the noise characteristic at the time of image capture as the similarity. Specifically, a similarity DNm between Nfm and Npv is expressed as follows.

$$Dnm = \sum_f |Nfm(f) - Npv(f)|$$

Note that a method for calculating the similarity is not limited to calculating the amount of the difference. For example, another technique such as a method of using a correlation coefficient may be used.

Video Image Characteristic Similarity Calculation Unit 1003

The operations of the video image characteristic similarity calculation unit 1003 will be described below. The video image characteristic similarity calculation unit 1003 calculates an absolute value of the difference between the data Sfm (m=1, 2 ..., M) obtained by reflecting the visual characteristic in the video image characteristic at the time of designing the filter m and the data Spv obtained by reflecting the visual characteristic in the video image characteristic at the time of image capture, as the similarity. Specifically, a similarity DSm between Sfm and Spv is expressed as follows.

$$Dsm = \sum_f |Sfm(f) - Spv(f)|$$

Note that a method of calculating the similarity is not limited to calculating the amount of the difference. For example, another technique, such as a method of using a correlation coefficient, may be used.

Filter Selection Unit 1004

The filter selection unit 1004 calculates a score for each filter using the similarity DNm (m=1, 2 ..., M) that was obtained in the noise characteristic similarity calculation unit 1002 and to which consideration of the visual characteristic of the noise characteristic is given, and the similarity DSm (m=1, 2 ..., M) that was obtained in the video image characteristic similarity calculation unit 1003 and to which consideration of the visual characteristic of the video image characteristic is given. Then, a filter whose score is the best is selected. In the present embodiment, the score for each filter is calculated by the sum of DSm and DNm, and the filter whose score is minimized is output as the optimal filter. Specifically, a filter number n that gives an optimal filter Fn is a value such that the sum of DSm and DNm is minimized, and is selected by the following equation.

$$n = \underset{m}{\mathrm{argmin}}(DSm + DNm)$$

In this way, the filter Fn generated based on the characteristic whose similarity is the highest is determined as a filter to be used.

Note that a method for calculating a score for each filter is not limited to the sum of DSm and DNm. For example, it may be possible to use a weighted linear combination of DSm and DNm.

According to the present embodiment, since it is not necessary to generate a filter for each image capture due to the above mentioned procedures, it is possible to determine a filter suitable to an image capture parameter and the human visual characteristic through a reduced amount of calculation, that is, alleviated processing load.

Note that if different values are used as the index m of DSm and DNm, the filter Fn associated with the combination of k and m such that the sum of the DSk and DNm is minimized is selected.

Other Embodiments

Aspects of the present invention can also be realized by a computer of a system or an apparatus (or devices, such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A noise reduction apparatus comprising:
an input unit configured to input a captured image signal from an image capturing unit;
an acquisition unit configured to acquire, according to a user operation, a temporal noise signal of the image capturing unit based on the captured image signal;
an estimation unit configured to estimate an ideal image signal that has no noise, based on the captured image signal input by the input unit and the temporal noise signal acquired by the acquisition unit;
a removing unit configured to remove a temporal frequency component higher than a predetermined threshold from each of the ideal image signal estimated by the estimation unit and the temporal noise signal acquired by the acquisition unit;
a generating unit configured to generate a filter that is used for temporal noise reduction for a captured image signal from the image capturing unit in accordance with an added signal obtained by adding the ideal image signal from which the temporal frequency component has been removed by the removing unit and the noise signal from which the temporal frequency component has been removed by the removing unit; and
a filtering unit configured to perform temporal noise reduction processing on an input image signal, captured by the image capturing unit, by using the filter generated by the generating unit.

2. The noise reduction apparatus according to claim 1, wherein the acquisition unit acquires the temporal noise signal of the image capturing unit from a captured image signal acquired by performing image capture without exposure.

3. The noise reduction apparatus according to claim 1, further comprising a video image characteristic acquisition unit that estimates a video image characteristic by subtracting a noise signal from the input image signal, or acquires a video image signal that was acquired in advance with little noise and stored.

4. The noise reduction apparatus according to claim 1, wherein the removing unit removes the temporal frequency component higher than the predetermined threshold from the temporal noise signal by performing convolution or multiplication of the predetermined human visual characteristic on the temporal noise signal.

5. The noise reduction apparatus according to claim 1, wherein the generating unit stores each of a plurality of pre-generated filters in association with a temporal noise signal and a captured image signal on which the removing processing is performed and selects a filter that is associated with the removed temporal noise signal and the captured image signal from each of which the temporal frequency component has been removed, based on a similarity to the stored captured image signal and the stored temporal noise signal.

6. The noise reduction apparatus according to claim 1, further comprising a storage unit configured to store a plurality of capturing parameters and a plurality of noise signals, each of the plurality of capturing parameters being associated with each of the noise characteristics,
wherein the acquisition unit selects, among the plurality of noise signals stored in the storage unit, a noise signal of the image capturing unit, based on the capturing parameter set at the image capturing unit that is capturing, to generate the captured image signal.

7. The noise reduction apparatus according to claim 1, wherein the acquisition unit selects one suitable temporal noise signal from among a plurality of pre-acquired noise signals in accordance with an image capture condition.

8. The noise reduction apparatus according to claim 1, wherein the predetermined threshold is 60 Hz.

9. A noise reduction method comprising:
inputting a captured image signal from an image capturing unit;
acquiring, according to a user operation, a temporal noise signal of the image capturing unit based on the captured image signal;
estimating an ideal image signal that has no noise, based on the captured image signal input in the inputting and the temporal noise signal acquired in the acquiring;
removing a temporal frequency component higher than a predetermined threshold from each of the ideal image signal estimated in the estimating and the temporal noise signal acquired in the acquiring;
generating a filter that is used for temporal noise reduction for a captured image signal from the capturing unit in accordance with an added signal obtained by adding the ideal image signal from which the temporal frequency component has been removed in the removing and the noise signal from which the temporal frequency component has been removed in the removing; and
performing temporal noise reduction processing on an input video image signal, captured by the image capturing unit, by using the filter generated in the generating.

10. The noise reduction method according to claim 9, further comprising storing a plurality of capturing parameters and a plurality of noise signals, each of the plurality of capturing parameters being associated with each of the noise characteristics,
wherein a noise signal of the image capturing unit is selected in the acquiring, among the plurality of noise signals stored in the storage unit, based on the capturing parameter set at the image capturing unit that is capturing, to generate the captured video image signal.

11. The noise reduction method according to claim 9, wherein the acquiring step comprises selecting one suitable temporal noise signal from among a plurality of pre-acquired noise signals in accordance with an image capture condition.

12. The noise reduction method according to claim 9, wherein the predetermined threshold is 60 Hz.

13. A non-transitory computer-readable medium having recorded thereon a program for causing a computer to execute a noise reduction process, the process comprising:
   inputting a captured image signal from an image capturing unit;
   acquiring, according to a user operation, a temporal noise signal of the image capturing unit based on the captured image signal;
   estimating an ideal image signal that has no noise, based on the captured image signal input in the inputting and the temporal noise signal acquired in the acquiring;
   removing a temporal frequency component higher than a predetermined threshold from each of the ideal image signal estimated in the estimating and the temporal noise signal acquired in the acquiring;
   generating a filter that is used for temporal noise reduction for a captured image signal from the capturing unit in accordance with an added signal obtained by adding the ideal image signal from which the temporal frequency component has been removed in the removing and the noise signal from which the temporal frequency component has been removed in the removing; and
   performing temporal noise reduction processing on an input image signal, captured by the image capturing unit, by using the filter generated in the generating.

14. The medium according to claim 13, wherein the process further comprises storing a plurality of capturing parameters and a plurality of noise signals, each of the plurality of capturing parameters being associated with each of the noise characteristics,
   wherein a noise signal of the image capturing unit is selected in the acquiring, among the plurality of noise signals stored in the storage unit, based on the capturing parameter set at the image capturing unit that is capturing, to generate the captured video image signal.

15. The medium according to claim 13, wherein the acquiring step further comprises selecting one suitable temporal noise signal from among a plurality of pre-acquired noise signals in accordance with an image capture condition.

16. The medium according to claim 13, wherein the predetermined threshold is 60 Hz.

* * * * *